United States Patent
Van Gelder et al.

(10) Patent No.: US 9,275,487 B1
(45) Date of Patent: Mar. 1, 2016

(54) SYSTEM AND METHOD FOR PERFORMING NON-AFFINE DEFORMATIONS

(75) Inventors: Dirk Van Gelder, San Francisco, CA (US); George Elkoura, Richmond, CA (US); Adam Woodbury, San Francisco, CA (US)

(73) Assignee: Pixar Animation Studios, Emeryville, CA (US)

( * ) Notice: Subject to any disclaimer, the term of this patent is extended or adjusted under 35 U.S.C. 154(b) by 1830 days.

(21) Appl. No.: 12/420,726

(22) Filed: Apr. 8, 2009

(51) Int. Cl.
*G06T 13/20* (2011.01)
*G06T 13/00* (2011.01)

(52) U.S. Cl.
CPC ............ *G06T 13/00* (2013.01); *G06T 2213/12* (2013.01)

(58) Field of Classification Search
USPC ........................................................ 345/647
See application file for complete search history.

(56) References Cited

U.S. PATENT DOCUMENTS

| | | | | |
|---|---|---|---|---|
| 5,995,107 A * | 11/1999 | Berteig et al. | ................. | 345/420 |
| 6,088,035 A * | 7/2000 | Sudarsky et al. | ............. | 345/421 |
| 7,225,114 B2 * | 5/2007 | Hayashi et al. | ................... | 703/6 |
| 7,554,549 B2 * | 6/2009 | Sagar et al. | ................... | 345/473 |
| 7,739,086 B2 * | 6/2010 | Hayashi et al. | ................... | 703/6 |
| 8,139,068 B2 * | 3/2012 | Isner et al. | ..................... | 345/474 |
| 2006/0139347 A1 * | 6/2006 | Choi | ................... | G06F 17/5018 345/419 |

* cited by examiner

*Primary Examiner* — M Good Johnson
(74) *Attorney, Agent, or Firm* — Patterson + Sheridan (57) ABSTRACT

A method for performing non-affine deformations. The method includes receiving data representing mathematical vectors associated with elements defining an object. The elements are organized in a hierarchy, a different subset of mathematical vectors is associated with one or more elements, and the mathematical vectors within each subset are defined relative to a local coordinate space associated with each element. The method further includes determining that a first non-affine deformer is to be applied to a first set of the elements, and, for each element in the first set, applying the first non-affine deformer to world coordinate space values corresponding to the mathematical vectors within the subset of mathematical vectors associated with the element to generate modified world coordinate space values for the mathematical vectors.

21 Claims, 4 Drawing Sheets

SYSTEM AND METHOD FOR PERFORMING NON-AFFINE DEFORMATIONS

BACKGROUND

1. Field of the Invention

The present invention relates to the field of computer graphics and, in particular, to a system and method for performing non-affine deformations.

2. Description of the Related Art

One core functional aspect of animation, simulation, or rendering applications is converting geometric and/or mathematical descriptions of objects into images. This process is known in the industry as "rendering." For movies or other feature films, a user (known as an animator) specifies the geometric description of objects (e.g., characters) by assigning poses and/or applying motions to the objects or to portions of the objects. Additionally, the animator may perform various transformations and/or deformations to the objects or to portions of the objects.

As is known, many graphics applications allow for a graphics scene to be represented as a hierarchy of objects. In a typical graphics application, the hierarchy includes one or more nodes connected to one another with links. In some conventional graphics applications, a parent node in the hierarchy may be connected to one or more child nodes that inherit the characteristics of the parent node. In other embodiments, the hierarchy may define a top-down geometric representation of the character, where each node defines further structural details of the character. For example, a "torso" node may be a parent node that is connected to child nodes such as a "left arm" node, a "right arm" node, a "left leg" node, and a "right leg" node. The left arm node, for example, may then be a parent node that is connected to child nodes such as "finger" nodes. This type of geometrical hierarchy is commonly referred to as a "transform hierarchy."

One feature of transform hierarchies is the ability to perform affine transformations. An affine transform typically includes performing linear transformations, such as rotating, scaling, shearing, or translating, to the geometry that comprise the nodes in the transform hierarchy. Affine transformations are typically carried out by applying a transformation matrix to points that define the geometry being transformed.

Another feature of some graphics applications is the ability to create a different type of hierarchy for rendering the scene known as a "data flow graph." The nodes that make up the data flow graph may represent atomic computations that are to be performed on some portion of the geometry. The nodes may then be strung together, forming the data flow graph. The input to the data flow graph may be the unaltered and untransformed object, while the output of the data flow graph may be the output object that has been modified by passing through one or more computational nodes. In some prior art systems, data flow graphs are used to perform "non-affine" transformations to the geometry in the scene. Non-affine transformation operators, also referred to herein as "movers" and "deformers," modify or mold the shape of geometry in a non-linear fashion. For example, an animated character may be defined by a mesh of primitives that represents the skin of the character. As the underlying joints of the character move, the skin changes shape and deforms based on the movement of the joints. The deformations in the skin are often non-linear and may be represented by a non-affine operator in a data flow graph.

One problem with performing non-affine transformations using a conventional data flow graph is that the deforming process is very inefficient. In a typical situation, there may be hundreds or thousands of atomic computations strung together in a data flow graph to perform a single non-affine transformation of a singe object, causing the non-affine transformation to be computationally expensive. Since the computations that make up the non-affine transformation are geometric computations, many of the computations occur in a particular coordinate space. Some computational operators are executed in a first coordinate space, while other computational operators are executed in a second coordinate space. Additionally, in conventional approaches, the results of computations must be propagated downward and affect subsequent computations on the data flow graph. These inherent constraints on traditional data flow graph approaches create classical inefficiencies, where data must be passed through the entirety of the data flow graph and may be converted between different coordinate spaces several times to accommodate the various coordinate spaces of the particular operators being executed. Since the computational operators cannot make assumptions about other computations that are being performed downstream, certain computations are performed in case another operator may require certain data. This redundancy in computation adds further complexity and adds to the inefficiency of conventional data flow graph approaches.

As the foregoing illustrates, there is a need in the art for an improved technique for performing non-affine transformations.

SUMMARY

Embodiments of the invention provide a system and method for performing non-affine deformations. Initially, each of the points associated with a character to which the non-affine deformation is applied is represented in local coordinate space. Then, the points associated with the elements that are affected by the non-affine deformer are selectively converted to world coordinate space in preparation for the deformation. Once the points associated with a particular element are in world coordinate space, the points may remain in world coordinate space until a parent element to that particular element is affected.

One embodiment of the invention provides a computer-implemented method for performing non-affine deformations. The method includes receiving data representing mathematical vectors associated with elements that define an object in a graphics scene, wherein the elements are organized in a hierarchical data structure, a different subset of mathematical vectors is associated with one or more elements, and the mathematical vectors within each subset of mathematical vectors are defined relative to a local coordinate space associated with the element associated with the subset of mathematical vectors; determining that a first non-affine deformer is to be applied to a first set of the elements that define the object, wherein the first set includes a portion of the elements that define the object; and, for each element in the first set, applying the first non-affine deformer to world coordinate space values corresponding to the mathematical vectors within the subset of mathematical vectors associated with the element to generate modified world coordinate space values for the mathematical vectors within the subset of mathematical vectors associated with the element.

Advantageously, embodiments of the invention provide an improved technique for efficiently performing non-affine deformations to elements included in a transform hierarchy when compared to prior art techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide a system and method for performing non-affine deformations. Initially, each of the points associated with a character to which the non-affine deformation is applied is represented in local coordinate space. Then, the points associated with the elements that are affected by the non-affine deformer are selectively converted to world coordinate space in preparation for the deformation. Once the points associated with a particular element are in world coordinate space, the points remain in world coordinate space until a parent element to the particular element is affected.

Figure 1:
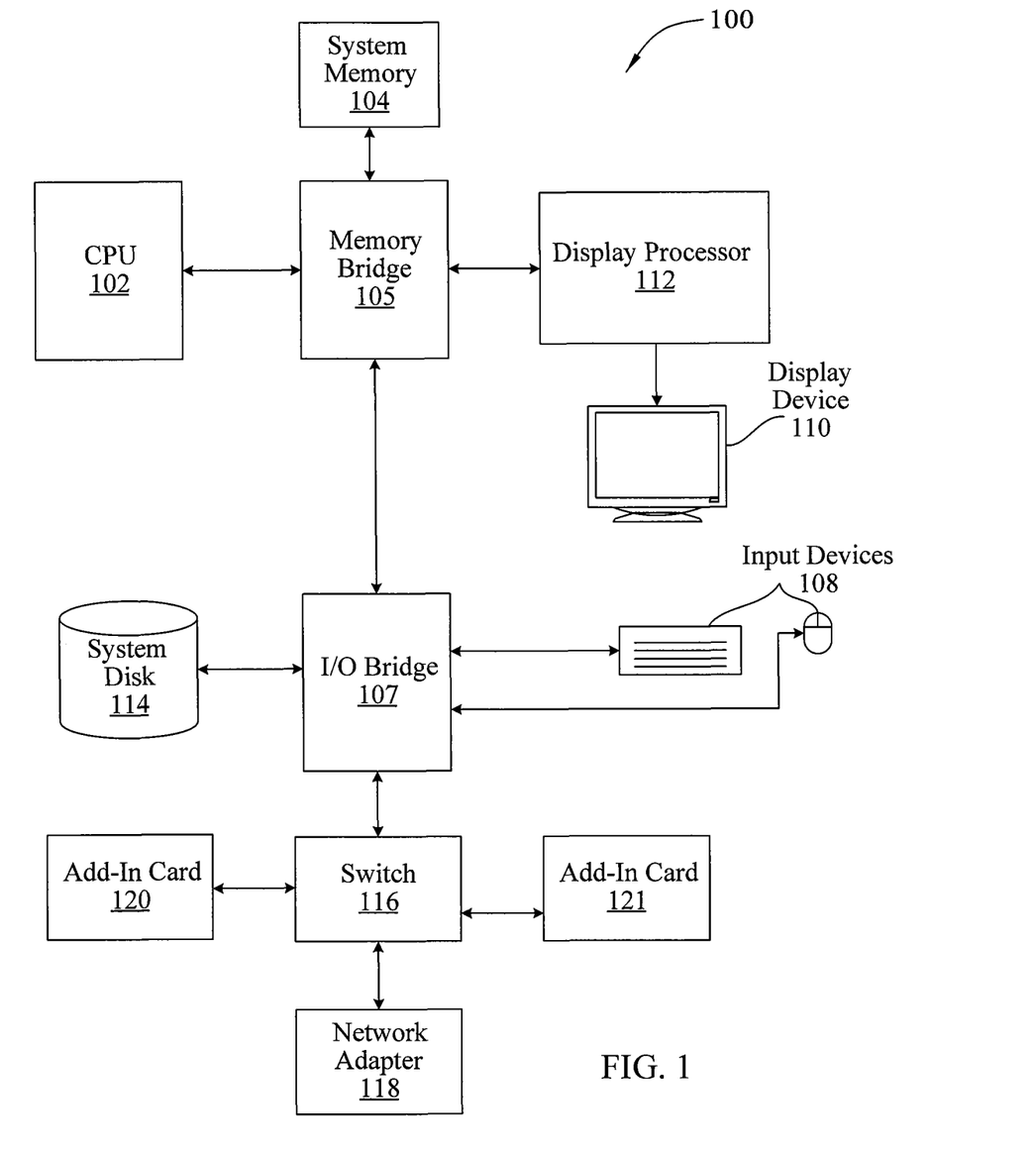
FIG. 1 is a block diagram of a system configured to implement one or more aspects of the invention.

FIG. 1 is a block diagram of a system 100 configured to implement one or more aspects of the present invention. System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. In alternative embodiments, the display processor may be a field-programmable gate array (FPGA), application-specific integrated circuit (ASIC), or other programmable and/or fixed function hardware.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2A:
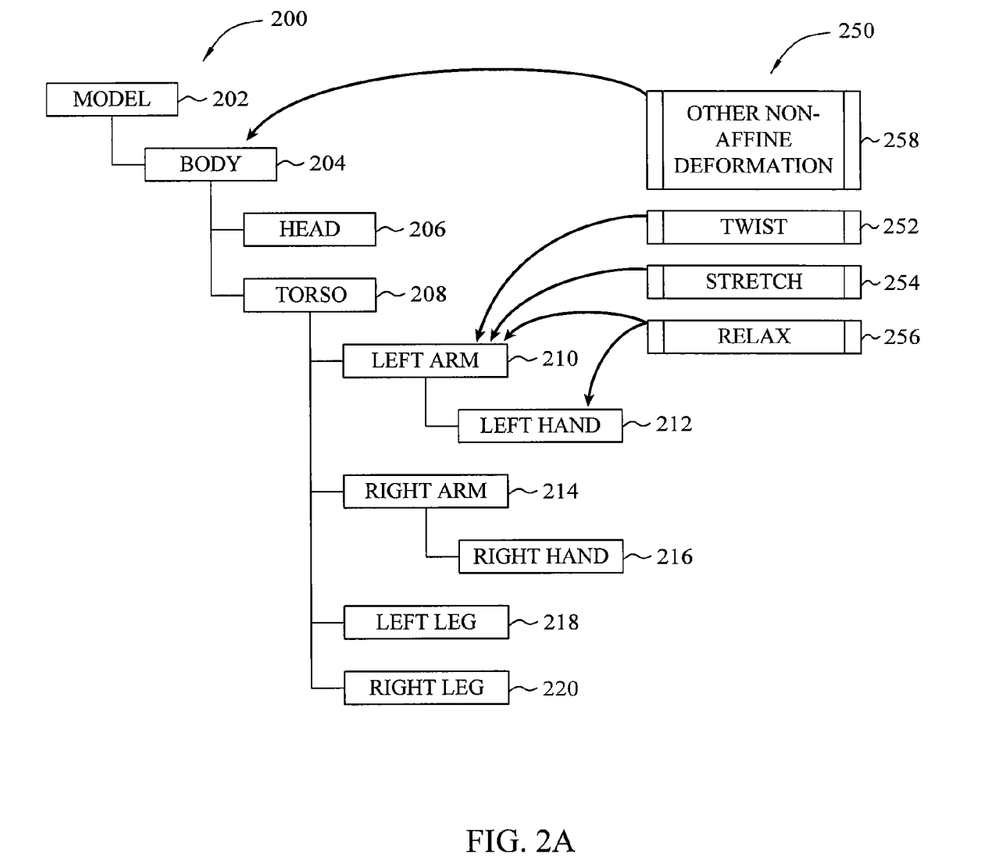
FIGS. 2A-2B are conceptual diagrams illustrating a transform hierarchy and a deform hierarchy, according to various embodiments of the invention.

FIG. 2A is a conceptual diagram illustrating a transform hierarchy 200 and a deform hierarchy 250, according to one embodiment of the invention. As shown, the transform hierarchy 200 includes a model 202. The model 202 includes a body 204. The body 204 includes a head 206 and a torso 208. The torso 208 includes a left arm 210, a right arm 214, a left leg 218, and a right leg 220. The left arm 210 includes a left hand 212. The right arm 214 includes a right hand 216. Each element in the transform hierarchy 200 represents a series of points that define geometric primitives or points associated with the element. For example, the head 206 represents a series of points defining the geometric primitives of the head of a character. In alternative embodiments, rather than being represented by a series of points, the elements in the transform hierarch 200 may be represented by vectors, rays, coordinate frames, normals, or any other type of mathematical vector used to represent data.

As should be understood by those having ordinary skill in the art, the elements illustrated in the transform hierarchy 200 are merely examples of elements included in a transform hierarchy. Embodiments of the invention equally apply to transform hierarchies where some of the elements are omitted and other elements are added to the transform hierarchy 200. Conventional approaches to performing affine transformations, such as rotating, scaling, shearing, and/or translating, are well-known. In one embodiment, a transform matrix may be applied to one or more of the elements in the transform hierarchy 200 to affect the affine transformation. For example, if an animator wishes to rotate the torso 208 of the character, then the animator may apply a rotational affine transformation matrix to the torso 208. In one embodiment, once of the torso 208 is rotated, the other elements in the transform hierarchy 200 that are subordinate to the torso 208 are also rotated to correspond with the rotation of the torso 208.

As also shown in FIG. 2A, the deform hierarchy 250 includes a twist deformer 252, a stretch deformer 254, a relax deformer 258, and an other non-affine deformer 258. In one embodiment, the deformers in the deform hierarchy 250 are organized in a hierarchical order, with the relax deformer 256 being the lowest-level deformer and the other non-affine deformer 258 being the highest-level deformer. Such a hierarchical order may be referred to as a "bottom-up" approach. In an alternate embodiment, the other non-affine deformer 258 is the lowest-level deformer in the hierarchy and the relax deformer 256 is the highest-level deformer in the hierarchy. Such an alternate hierarchical order may be referred to as a "top-down" approach. As should be understood by those having ordinary skill in the art, additional non-affine deformers may be included in the deform hierarchy 250. Examples of non-affine deformers include, without limitation, a bend deformer, a bow deformer, a lattice deformer, a squetch deformer, a relax deformer, a repulse deformer, an attach_points deformer, a copy_subdiv_points deformer, a curve_deform deformer, a curve_fit deformer, a cylinder_deform deformer, a frame_deform deformer, a joint_mover deformer, a lattice_deform deformer, a multi_rotate deformer, a multi_sculpt deformer, a radial_reformer deformer, a radial_rotate deformer, a radial_squetch deformer, a rotate deformer, a scale deformer, a sculpt_deform deformer, a single_rotate deformer, a std_animation_variables deformer, a subdiv_warp deformer, a surface_deform deformer, a tet_warp deformer, a transform_deform deformer, a translate deformer, and a volume_warp_deform deformer.

In one embodiment, the animator or articulator can choose to apply various non-affine deformers to elements in the transform hierarchy 200. Conventional approaches to performing non-affine deformations involve data flow graphs. These conventional approaches are very inefficient, as described above.

In FIG. 2A, the relax deformer 256 is applied to the left arm 210 and to the left hand 212. The stretch deformer 254 is applied to the left hand 210. The twist deformer 252 is also applied to left hand 210. The other non-affine deformer 258 is applied to the body 204. When a non-affine deformer is applied to an element in the transform hierarchy 200, the points defining the element are updated to reflect a change in position based on the characteristics of the deformer being applied. Additionally, subordinate elements to the deformed element are "moved" in a rigid manner to correspond to the changes in the deformed element, but are not themselves deformed. For example, when the left arm 210 is twisted by the twist deformer 252, the points that define the left arm 210 are twisted in a manner associated with the twist deformer 252. The left hand 212 is not twisted by the twist deformer 252. However, the points that define the left hand 212 are rotated or moved to maintain coherence with the updated points of the twisted left arm 210. As will be described in greater detail herein, embodiments of the invention provide one or more techniques for efficiently applying non-affine deformations, represented the deform hierarchy 250, to certain elements in a transform hierarchy 200.

Figure 3:
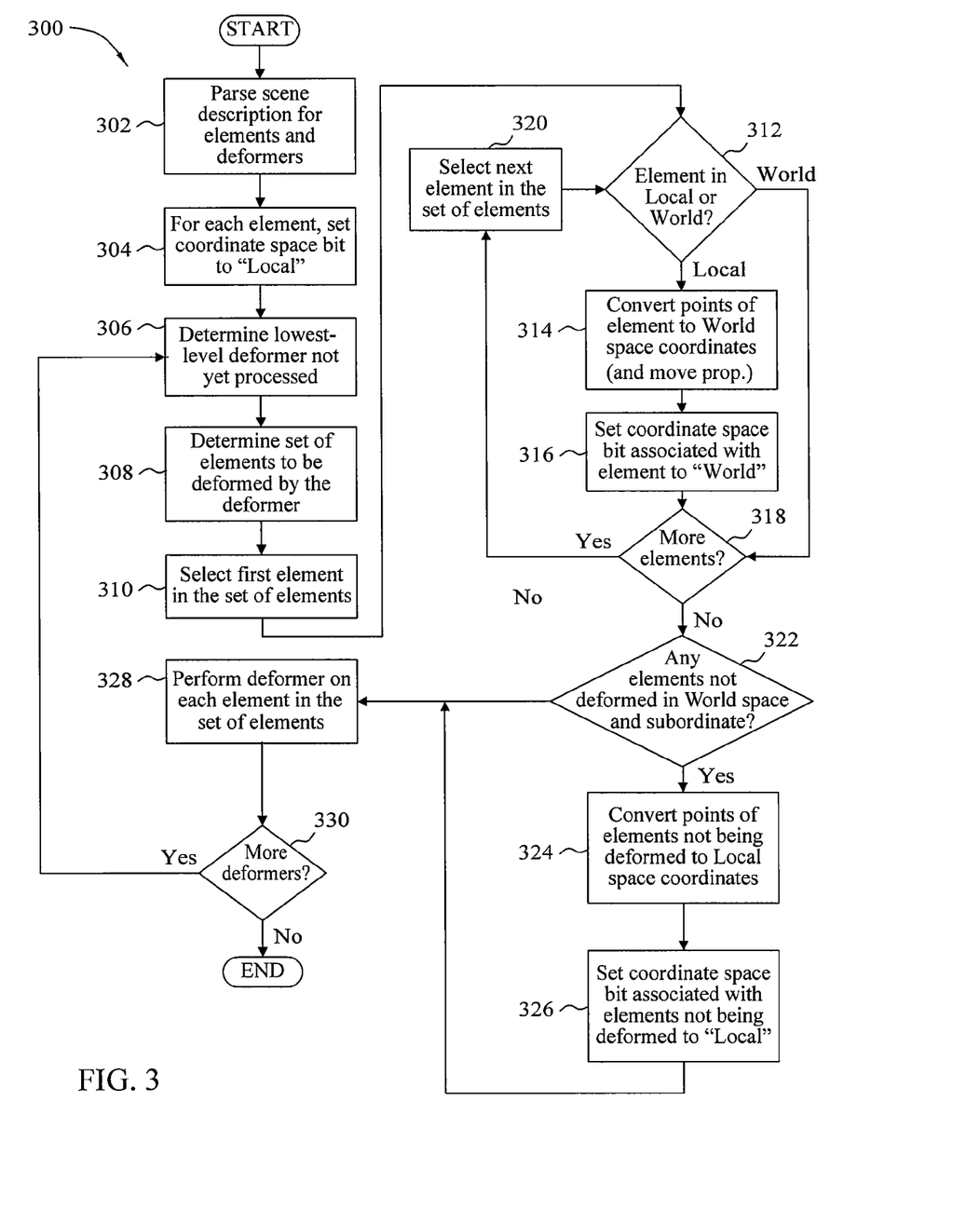
FIG. 3 is a flow diagram of method steps for efficiently applying non-affine deformations to elements in the transform hierarchy, according to one embodiment of the invention.

FIG. 3 is a flow diagram of method steps for efficiently applying non-affine deformations to elements in the transform hierarchy 200. Persons skilled in the art will understand that, even though the method 300 is described in conjunction with the systems of FIGS. 1 and 2, any system configured to perform the method steps, in any order, is within the scope of embodiments of the invention.

As shown, the method 300 begins at step 302, where a software application parses a scene description for elements and deformers. The software application may be stored in the system memory 104 and executed by the CPU 102 and/or the display processor 112. In one embodiment, the software application is a rendering application executed by the CPU 102. As described herein, the scene description includes geometric elements that define a transform hierarchy. Additionally, the scene description may include deformers that are to be applied to the geometric elements in the scene description.

At step 304, for each element in the scene description, the software application sets a coordinate space bit to "local." In one embodiment, each element in the transform hierarchy may be designated with a coordinate space bit that is either set to "local," representing local space coordinates, or "world," representing world space coordinates. As persons having ordinary skill in the art would understand, when an element is represented in local coordinate space, the points that define the element have coordinates relative a local origin particular to the element. For example, a left hand may be defined by a series of points. When the left hand is in local coordinate space, the coordinates of the points that define the left hand are defined using a coordinate axis with an origin relative to just the left hand. In contrast, when an element is in world coordinate space, the points that define the element have coordinates relative to a global origin particular to the entire scene (or to the entire character, for example).

At step 306, the software application determines the lowest level deformer not yet processed. In one embodiment, determining the lowest level deformer may be performed by analyzing the deform hierarchy to determine what is the lowest deformer in the deform hierarchy. At step 308, the software application determines a set of elements to be deformed by the deformer determined at step 306. Referring to FIG. 2A, the set of elements to be deformed by the relax deformer 256 includes the left arm 210 and left hand 212. In contrast, the set of elements to be deformed by the stretch deformer 234 includes the left arm 210, but does not include the left hand 212.

At step 310, the software application selects a first element in the set of elements. At step 312, the software application determines if the first element is represented in local coordinate space or world coordinate space. In one embodiment, step 312 may be performed by checking the coordinate space bit associated with the first element. If, at step 312, the element is in world space, then the method 300 proceeds to step 318. If, at step 312, the element is in local space, then the method 300 proceeds to step 314.

At step 314, the software application converts points of the first element to world space coordinates. Various techniques are known in the art for performing a conversion from local coordinate space to world coordinate space, and vise-versa. Additionally, at step 314, the software application determines whether any elements receive move propagation from the element converted to world coordinate space. If the software application determines that no other elements receive move propagation from element converted to world coordinate space, then the method proceeds to step 316. If the software application determines that at least one element receives move propagation from element converted to world coordinate space, then move propagation is performed. For example, referring to FIG. 2A, if the deformer being applied is the stretch deformer 254 (applied to left arm 210), then the points in the left arm are converted to world space coordinates. Additionally, since the left hand 212 is subordinate to the left arm 210 in the transform hierarchy 200, the points defining the left hand 210 receive move propagation from the left arm 210. Although the points in the left hand 212 are not deformed by the stretch deformer 254, the points in the left hand 212 are moved to a different position based on the change in position of the points in the left arm 210.

At step 316, the coordinate space bit associated with the first element is set to "world." As described in relation to step 304, each element in the transform hierarchy may be associated with a coordinate space bit. Once the points of a particular element are converted to world space coordinates at step 314, then the coordinate space bit associated with the particular element is set to "world" to maintain consistency. At step 318, the software application determines whether any other elements are included in the set of elements. If no other elements are included in the set of elements, then the method 300 proceeds to step 322. In alternative embodiments, step 318 is omitted from the method 300 and the steps 312, 314, and 316 are performed for a single element in the set of elements.

If, at step 318, the software application determines that one or more additional elements are included in the set of elements, then the method 300 proceeds to step 320. At step 320, the software application selects the next element in the set of elements. The method 300 then returns to step 312. When viewed collectively, steps 310, 312, 314, 316, 318, and 320, operate to convert each of the elements included in the set of elements to world space coordinates. Each element in the set of elements is converted to world space coordinates since the deformer that is to be applied to the elements in the set of elements operates in world space coordinates and not in local space coordinates. Additionally, as described above in relation to step 312, if an element is already in world space coordinates, no conversion is necessary. By maintaining the coordinate space bit that identifies whether the points of the element are in local space or world space, less coordinate space conversions are performed, thereby increasing the computational efficiency of applying the non-affine deformer. In still further embodiments, steps 312, 314, and 316 are performed for some, but not all, of the elements in the set of elements.

At step 322, the software application determines whether any elements not being deformed by the deformer are in world space and whether any such elements are subordinate to any element in the set of elements. Similar to the operation at step 312, the operation at step 322 may be performed by checking the coordinate space bit associated with the other elements in the transform hierarchy. If, at step 322, the software application determines that no other elements are in world space besides those included in the set of elements, then the method 300 proceeds to step 328. If, on the other hand, the software application determines that at least one other element besides those elements included in the set of elements is in world space and is subordinate to one of the elements in the set of elements, then the method 300 proceeds to step 324. Importantly, if the software application determines that at least one other element besides those elements included in the set of elements is in world space, but such an element is not subordinate to one of the elements in the set of elements, then the method 300 proceeds to step 328. Thus, unnecessary conversions between local and world coordinate space are minimized. An example illustrating these advantages is described in greater detail below in FIG. 2B.

At step 324, the software application converts the points associated with each element that is in world space and that is subordinate to at least one element in the set of elements to local space coordinates. Again, similar to step 314, various techniques for performing the conversion at step 324 are known in the art. At step 326, the software application sets the coordinate space bit associated with each element converted at step 324 to "local." After step 326, the method 300 proceeds to step 328.

At step 328, the software application performs the deformation associated with the lowest level deformer (determined at step 306) to each element that is in the set of elements. Various techniques are known for performing the deformation described in step 328. Again, examples of deformations include a relax operation, a stretch operation, a twist operation, a bulge operation, or any other non-affine deformation. In one embodiment, other elements may be in world coordinate space, but are not deformed by the lowest level deformer since these elements are not included in the set of elements. An example is described in greater detail below in FIG. 2B.

At step 330, the software application determines whether any other deformers are included in the deform hierarchy 250 that have not yet been processed. If the software application determines that there are no other such deformers, then the method 300 terminates. If the software application determines that other deformers are included in the deform hierarchy 250 that have not yet been processed, then the method 300 returns to step 306, described above.

The method 300 described above provides several advantages over conventional approaches to performing deformations to elements in the transform hierarchy. As described, only those elements that are to be deformed by a particular deformer are converted to world space coordinates to complete the deformation. Other elements that are not deformed are not converted to world space coordinates, thus saving computational cost. Additionally, an element that is already in world space coordinates is not naïvely converted back to local space coordinates when further deformations may be performed for that particular element. These features and advantages of the method 300 are clearly illustrated by way of an examples described in detail below.

For example, the method 300 can be applied to deform one or more of the elements included in the transform hierarchy 200 based on the deform hierarchy 250, described above in FIG. 2A. As shown in FIG. 2A, the relax deformer 256 is applied to left arm 210 and to left hand 212, whereas the stretch deformer 254 and the twist deformer 252 are applied to the left arm 210. Additionally, the other non-affine deformation 258 is applied to the body 204.

Referring to the method 300 described in FIG. 3, the scene description is parsed to determine the transform hierarchy 200 and the listing of deformers included in the deformer hierarchy 250 (step 302). Each of the elements in the transform hierarchy 200 is in local coordinate space, and the coordinate space bit associated with each element is set to "local" (step 304). The software application determines that the relax operator 256 is the lowest level deformer not yet processed (step 306). Then, the software application determines that the left hand 212 and the left arm 210 are included in the set of elements to be deformed by the relax deformer (step 308), and converts the points included in the left hand 212 and the left arm 210 to world space coordinates (steps 310, 312, 314, 316, 318).

The software application then determines that no other elements are in world space (step 322) and performs the relax deformation to the points in the left hand 212 and the left arm 210 (step 328).

Next, the software application determines that the stretch deformer 254 is the next lowest level deformer not yet processed (step 306). The software application determines that the set of elements to which the stretch deformer 254 is applied includes the left arm 210 (step 308). The software application also determines that the left arm 210 is already in world space coordinates (step 312) and that no other elements are included in the set of elements deformed by the stretch deformer 254 (step 318). The software application then determines that at least one other element that is subordinate to at least one element in the set of elements is currently in world space, but not to be deformed by stretch deformer 254, namely the left hand 212 (step 322). Thus, the software application converts the points in the left hand 212 to local space (steps 324, 326).

The stretch operation is then performed upon the left arm 210 (step 328). Next, the software application determines that the twist deformer 252 is the next lowest-level deformer not yet processed (step 306). The software application determines that the set of elements to which the twist deformer 252 is applied includes left arm 210 (step 308). The software application also determines that the left arm 210 is already in world space coordinates (step 312) and that no other elements are included in the set of elements deformed by the twist deformer 252 (step 318). The software application then determines that no other elements are currently in world space besides those elements to be deformed by twist deformer 252 (step 322). The twist operation is then performed upon the left arm 210 (step 328).

Next, the software application determines that the other non-affine deformer 258 is the next lowest-level deformer not yet processed (step 306). The software application determines that the set of elements to which the other non-affine deformer 258 is applied includes the body 204 (step 308). The software application also determines that the body 204 is in local space coordinates (step 312) and converts the points of the body 204 to world space coordinates (steps 314, 316). The elements that are subordinate to the body 204 receive move propagation from the body 204. The software application then determines that other elements that are subordinate to the body 204 are currently in world space, but not to be deformed by the other non-affine deformer 258, namely the left arm 210 (step 322). Thus, the software application converts the points in the left arm 210 to local space (steps 324, 326). The other non-affine deformer 258 is then applied to the body 204 (step 328). The software application determines that no other deformers remain to be processed (step 330) and the method 300 terminates.

Figure 2B:
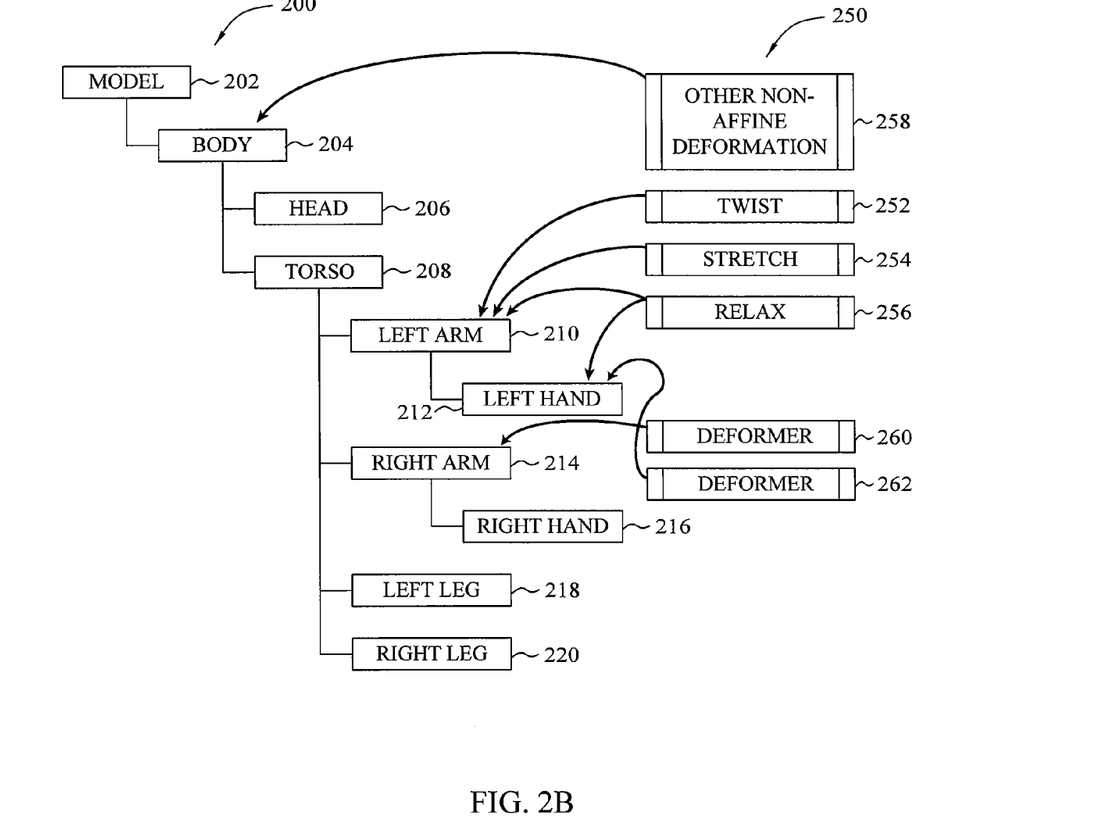

Another example of applying the method 300 to a transform hierarchy is described in relation to FIG. 2B. FIG. 2B is a conceptual diagram illustrating a transform hierarchy 200 and a deform hierarchy 250, according to various embodiments of the invention. As shown, the transform hierarchy includes the same elements described in FIG. 2A. The deform hierarchy 250 includes the deformers 252, 254, 256, and 258 (shown in FIG. 2A) and also includes additional deformers 260 and 262.

In the example described below, the deformers in the deform hierarchy 250 are listed bottom-up, where the deformer 262 is the first deformed to be processed, followed by the deformer 260, and so on.

Referring to the method 300 described in FIG. 3, the scene description is parsed to determine the transform hierarchy 200 and the listing of deformers included in the deformer hierarchy 250, as shown in FIG. 2B (step 302). Each of the elements in the transform hierarchy 200 is in local coordinate space, and the coordinate space bit associated with each element is set to "local" (step 304). The software application determines that the deformer 262 is the lowest level deformer not yet processed (step 306). Then, the software application determines that the left hand 212 is included in the set of elements to be deformed by the deformer 262 (step 308), and converts the points included in the left hand 212 to world space coordinates (steps 310, 312, 314, 316, 318). The software application then determines that no other elements are in world space (step 322) and performs the deformation associated with the deformer 262 to the points in the left hand 212 (step 328).

Next, the software application determines that the deformer 260 is the next lowest level deformer not yet processed (step 306). The software application determines that the set of elements to which the deformer 260 is applied includes the right arm 214 (step 308), and converts the points included in the right arm 214 to world space coordinates (steps 310, 312, 314, 316, 318).

The software application also determines that the left hand 212 is already in world space coordinates (step 322), but the left hand 212 is not subordinate to the right arm 214. Thus, the points in the left hand 212 remain in world space. Greater computational efficiency is achieved here since the points in the left hand remain in world coordinate space and are not naively converted back to local coordinate space. The deformation associated with the deformer 260 is then performed upon the right arm 214 (step 328). The remaining steps performed to complete the deformations may be substantially similar to those described in the example above that refers to FIG. 2A, with modifications for returning the right arm 214 back to local coordinate space when appropriate.

In one embodiment, the method 300 described in FIG. 3 provides a "bottom-up" approach to performing deformations to elements included in the transform hierarchy 200. As described in step 306, the software application processes the deformations beginning with the lowest level of deformer not yet processed and moving up the deform hierarchy 250. In alternative embodiments, at step 306, rather than determining the lowest level deformer not yet processed, the software application may determine the highest level to former not yet processed. In these embodiments, the method 300 provides a "top-down" approach to performing deformations. For example, in a top-down approach, the other non-affine deformer 258 may be the first deformer applied to the transform hierarchy 200. The twist deformer 252, the stretch deformer 254, and the relax deformer 256, are subsequently processed in turn.

Additionally, in some embodiments, when the scene description is parsed by the software application at step 302, the result is a point pool that includes points associated with each element included in the transform hierarchy 200. In one embodiment, each of the points included in the point pool is represented in local coordinate space. Since the deformers may be applied to only a portion of the elements in the transform hierarchy 200, some of the points in the point pool are not converted to world space coordinates during application for the deformers. In other embodiments, when the scene description is parsed at step 302, the resulting point pool may include only points associated with elements in the transform hierarchy 200 that are actually deformed by the deformers included in the deform hierarchy 250. As should be understood by those having ordinary skill in the art, various other parsing techniques and implementations are also within the scope of embodiments of the invention.

Additionally, in still further embodiments, a character represented by the transform hierarchy 200 is converted to world space coordinates to achieve a final rendered output of the character after the completion of processing of the various deformers. In other embodiments, after the deformers have each been applied, the points associated with the character remain in local coordinate space and are stored in a memory. The final rendered output may then be generated by a software rendering engine, a hardware rendering engine, or a combination of a software and hardware rendering engine. The rendering engine used to generate the final rendered output of the character may reside in a separate computer system from the computer system that performs the deformations described in FIG. 3. For example, the final rendered output may be generated by a real-time rendering engine, such as a game engine.

In still further embodiments, one or more of the steps described in the method 300 are performed by fixed-function and/or programmable hardware elements, and not by a software application. In still further embodiments, one or more of the steps described in the method 300 are performed by a combination of software and hardware.

Advantageously, embodiments of the invention provide an improved technique for efficiently performing non-affine deformations to elements included in a transform hierarchy. The elements that are deformed are converted to world space coordinates, while the elements that are not deformed remain in local space coordinates. Computational cost is minimized by converting only those elements necessary to perform the deformations. Additionally, embodiments of the invention convert elements from world space coordinates back to local space coordinates once no further deformations are to be performed upon those elements. Thus, computational cost is further minimized by selectively converting to local space only those elements that are not deformed by subsequent deformations. Accordingly, the techniques described herein provide a more efficient processing technique to performing non-affine deformations to elements in a transform hierarchy when compared to prior art techniques.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer implemented method for applying deformations to a hierarchy of elements, the method comprising:
receiving an element hierarchy for an object in a scene, wherein points for each element of the object are initially represented using a local coordinate space in which the points for the element have coordinates defined relative to a local origin for the element;
determining, by operation of one or more computer processors, a first non-affine deformer to be applied to a first one or more of the elements of the object, wherein the non-affine deformer operates in a world coordinate space in which points have coordinates defined relative to a global origin;

for each element of the first one or more of the elements:
converting the points of the element into the world coordinate space, and
upon determining the element has one or more subordinate elements in the element hierarchy to which the non-affine deformer is not applied:
converting points of each of the one or more subordinate elements to a local coordinate space for the subordinate element if the points are currently represented using the world coordinate space; and
marking the one or more subordinate elements to receive move propagation when the non-affine deformer is applied to the element but not applied to the one or more subordinate elements; and applying, by operation of the computer processors, the first non-affine deformer to the first one or more elements of the object in the world coordinate space.

2. The method of claim 1, further comprising:
following the application of the deformer to the determined one or more elements, applying the move propagation to each of the one or more subordinate elements.

3. The method of claim 1, further comprising:
determining a second non-affine deformer to be applied to a second one or more of the elements of the object; and
for each of the second one or more elements to which the second non-affine deformer is to be applied:
in response to identifying that points of the element are currently represented using the local coordinate space, converting the points of the element to the world coordinate space.

4. The method of claim 3, further comprising, applying the second non-affine deformer to the second one or more elements.

5. The method of claim 3, wherein the second non-affine deformer is subordinate to the first non-affine deformer in a deformer hierarchy associated with the scene.

6. The method of claim 1, wherein the first non-affine deformer causes a non-linear operation to be performed to the points of the first one or more elements in the world coordinate space.

7. The method of claim 6, wherein the first non-affine deformer comprises a bend deformer, a bow deformer, a lattice deformer, a stretch deformer, a relax deformer, or a repulse deformer.

8. A non-transitory computer-readable storage medium storing one or more applications, which, when executed on a processor, perform an operation for applying deformations to a hierarchy of elements, the operation comprising:
receiving an element hierarchy for an object in a scene, wherein points for each element of the object are initially represented using a local coordinate space in which the points for the element have coordinates defined relative to a local origin for the element;
determining, by operation of one or more computer processors, a first non-affine deformer to be applied to a first one or more of the elements of the object, wherein the non-affine deformer operates in a world coordinate space in which points have coordinates defined relative to a global origin;
for each element of the first one or more of the elements:
converting the points of the element into the world coordinate space, and
upon determining the element has one or more subordinate elements in the element hierarchy to which the non-affine deformer is not applied:
converting points of each of the one or more subordinate elements to a local coordinate space for the subordinate element if the points are currently represented using the world coordinate space; and
marking the one or more subordinate elements to receive move propagation when the non-affine deformer is applied to the element but not applied to the one or more subordinate elements; and applying, by operation of the computer processors, the first non-affine deformer to the first one or more elements of the object in the world coordinate space.

9. The computer-readable storage medium of claim 8, wherein the operation further comprises:
following the application of the deformer to the determined one or more elements, applying the move propagation to each of the one or more subordinate elements.

10. The computer-readable storage medium of claim 8, wherein the operation further comprises:
determining a second non-affine deformer to be applied to a second one or more of the elements of the object; and
for each of the second one or more elements to which the second non-affine deformer is to be applied:
in response to identifying that points of the element are currently represented using the local coordinate space, converting the points of the element to the world coordinate space.

11. The computer-readable storage medium of claim 10, wherein the operation further comprises, applying the second non-affine deformer to the second one or more elements.

12. The computer-readable storage medium of claim 10, wherein the second non-affine deformer is subordinate to the first non-affine deformer in a deformer hierarchy associated with the scene.

13. The computer-readable storage medium of claim 8, wherein the first non-affine deformer causes a non-linear operation to be performed to the points of the first one or more elements in the world coordinate space.

14. The computer-readable storage medium of claim 13, wherein the first non-affine deformer comprises a bend deformer, a bow deformer, a lattice deformer, a stretch deformer, a relax deformer, or a repulse deformer.

15. A system, comprising:
a processor; and
a memory storing one or more applications, which, when executed on the processor, perform an operation for applying deformations to a hierarchy of elements, the operation comprising:
receiving an element hierarchy for an object in a scene, wherein points for each element of the object are initially represented using a local coordinate space in which the points for the element have coordinates defined relative to a local origin for the element,
determining, by the processor, a first non-affine deformer to be applied to a first one or more of the elements of the object, wherein the non-affine deformer operates in a world coordinate space in which points have coordinates defined relative to a global origin,
for each element of the first one or more of the elements:
converting the points of the element into the world coordinate space; and
upon determining the element has one or more subordinate elements in the element hierarchy to which the non-affine deformer is not applied:

converting points of each of the one or more subordinate elements to a local coordinate space for the subordinate element if the points are currently represented using the world coordinate space, and marking the one or more subordinate elements to receive move propagation when the non-affine deformer is applied to the element but not applied to the one or more subordinate elements, and applying, by operation of the computer processors, the first non-affine deformer to the first one or more elements of the object in the world coordinate space.

16. The system of claim 15, wherein the operation further comprises:
following the application of the deformer to the determined one or more elements, applying the move propagation to each of the one or more subordinate elements.

17. The system of claim 15, wherein the operation further comprises:
determining a second non-affine deformer to be applied to a second one or more of the elements of the object; and
for each of the second one or more elements to which the second non-affine deformer is to be applied:
in response to identifying that points of the element are currently represented using the local coordinate space, converting the points of the element to the world coordinate space.

18. The system of claim 17, wherein the operation further comprises, applying the second non-affine deformer to the second one or more elements.

19. The system of claim 17, wherein the second non-affine deformer is subordinate to the first non-affine deformer in a deformer hierarchy associated with the scene.

20. The system of claim 15, wherein the first non-affine deformer causes a non-linear operation to be performed to the points of the first one or more elements in the world coordinate space.

21. The system of claim 20, wherein the first non-affine deformer comprises a bend deformer, a bow deformer, a lattice deformer, a stretch deformer, a relax deformer, or a repulse deformer.

* * * * *

UNITED STATES PATENT AND TRADEMARK OFFICE
CERTIFICATE OF CORRECTION

PATENT NO. : 9,275,487 B1  
APPLICATION NO. : 12/420726  
DATED : March 1, 2016  
INVENTOR(S) : Van Gelder et al.

Page 1 of 1

It is certified that error appears in the above-identified patent and that said Letters Patent is hereby corrected as shown below:

In the Specification

In the Background:

Column 2, Line 3, please delete "singe" and insert --single-- therefor;

In the Detailed Description of Exemplary Embodiments:

Column 6, Line 6, please delete "an";

Column 6, Line 20, please delete "squetch" and insert --stretch-- therefor;

Column 6, Line 27, please delete "squetch" and insert --stretch-- therefor.

Signed and Sealed this  
Twenty-first Day of June, 2016

Michelle K. Lee  
*Director of the United States Patent and Trademark Office*